United States Patent [19]

Lich et al.

[11] Patent Number: 4,878,436
[45] Date of Patent: Nov. 7, 1989

[54] RAILCAR MOVING VEHICLE

[75] Inventors: Richard L. Lich, Newnan, Ga.; Robert L. Siewert, Loudon, Tenn.

[73] Assignee: Trackmobile, Inc., LaGrange, Ga.

[21] Appl. No.: 161,964

[22] Filed: Apr. 29, 1988

[51] Int. Cl.⁴ .............................................. B61C 11/00
[52] U.S. Cl. ................... 105/72.2; 105/26.1; 105/215.2
[58] Field of Search ............ 105/26.1, 27, 72.2, 105/96, 4.4, 215.1, 215.2, 75, 443; 74/496

[56] References Cited

U.S. PATENT DOCUMENTS

| | | | |
|---|---|---|---|
| 3,198,137 | 2/1963 | White, Jr. ........................... | 105/27 |
| 3,605,932 | 4/1969 | Wilfert et al. ..................... | 74/496 X |
| 4,067,259 | 1/1978 | Ames et al. ....................... | 105/26.1 X |
| 4,355,584 | 10/1982 | White, Jr. ........................... | 105/72.2 |

OTHER PUBLICATIONS

Brochure-There's Something New Coming Down the Track, The New 12,000-Switchmaster-Marmon Transmotive Company-Feb. 1987.
Brochure-Model 12,000 Switchmaster by Marmon Transmotive Company, Feb. 1987.

Primary Examiner—Johnny D. Cherry
Assistant Examiner—Dean J. Kramer
Attorney, Agent, or Firm—Allegretti & Witcoff, Ltd.

[57] ABSTRACT

A railcar moving vehicle having rail wheels for operating on railroad track and having retractable road wheels for operating on road, the vehicle having a main frame and a pivotable frame which is connected to the main frame by a longitudinal pivot, there being mounted on the pivotable frame one rail wheel axle, a pair of driven road wheels, and hydraulic cylinders for raising and lowering the driven road wheels between inoperative and operative positions, whereby both the driven road wheels as well as the rail wheels are capable of oscillating or pivoting action to maintain equal wheel loadings on both the rail wheels and the road wheels.

4 Claims, 3 Drawing Sheets

RAILCAR MOVING VEHICLE

BRIEF SUMMARY OF THE INVENTION

The present invention relates to a railcar moving vehicle which operates on rail to push or pull one or more railcars and is also operable on the road when a plurality of road wheels are moved downwardly into operative positions.

It is known in the art to provide a railcar moving vehicle having a main frame member and a second frame which is connected to the main frame for relative pivotal movement about a longitudinal axis. Such a railcar moving vehicle is disclosed in U.S. Pat. No. 4,355,584.

The railcar moving vehicle disclosed in the foregoing U.S. patent offers the advantage that one rail wheel axle is mounted on a pivotable frame member to permit pivotal movement between that rail wheel axle and the other rail wheel axle which is mounted on the main frame member. However, in that known design all four road wheels are carried on the main frame so that when operating on roadway there is no benefit from the pivotal frame assembly.

It is an object of the present invention to provide a railcar moving vehicle having a main frame and a pivotable frame where, in addition to mounting one rail wheel axle on the pivotable frame member, there are also mounted on the pivotable frame member a pair of driven road wheels together with cylinder means for raising and lowering the driven road wheels between inoperative and operative positions.

Another object of the invention is to provide a railcar moving vehicle where the driven road wheels are carried on a rear pivotable frame member and the steerable road wheels are carried on the forward main frame member thereby achieving front wheel steering for the vehicle.

A further object of our invention is to provide a railcar moving vehicle as last above-mentioned where a pair of driven road wheels are mounted directly from a rail wheel axle which itself is carried on a rear pivotable frame member, the driven road wheels being pivotally movable about the rail wheel axle between operative and inoperative positions.

Still another of our objects is to provide a railcar moving vehicle where a cab is carried on a forward end of a main frame and a pair of driven road wheels are carried at the rear of the vehicle on a separate pivotable frame member whereby the driven road wheels when raised to inoperative positions are located behind access steps depending from the cab thus guarding against injury from the driven road wheels which continue to rotate when in their raised inoperative positions.

An additional object of the invention is to provide a railcar moving vehicle where both the rail wheels and the road wheels can oscillate on a pivoted frame member and thereby maneuver over uneven track or roadway to maintain substantially equal wheels loadings whether operating on rail or on roadway.

The foregoing and other objects and advantages of our invention will be apparent from the following description of a preferred embodiment, taken in conjunction with the accompanying drawings.

Now, in order to acquaint those skilled in the art with the manner of making and using our invention, we shall describe, in conjunction with the accompanying drawings, a preferred embodiment of the invention.

DETAILED DESCRIPTION OF THE INVENTION

Figure 1:
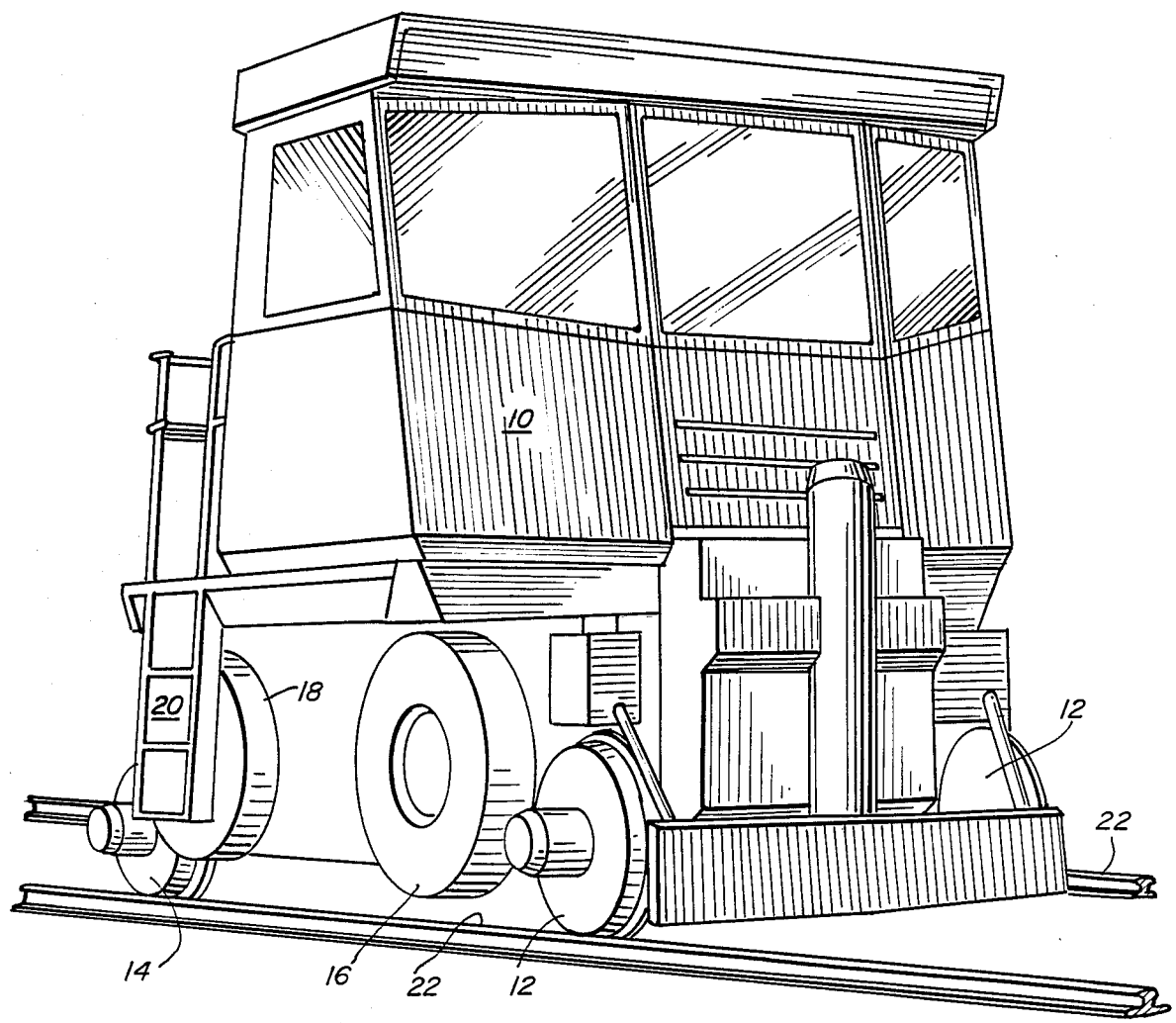
FIG. 1 is a schematic, perspective view of a railcar moving vehicle constructed in accordance with the present invention and illustrating the road wheels in their raised inoperative positions with the rear, driven road wheels located behind access steps depending from the rear of the cab.

Referring now to the drawings, FIG. 1 illustrates a cab 10 having a pair of front rail wheels 12 and rear rail wheels 14, a pair of front steerable road wheels 16, and a pair of rear driven road wheels 18. Each side of the cab is provided with depending access steps 20 which enable an operator to climb up to the cab.

As shown in FIG. 1, the vehicle is operating on rail 22 with the road wheels 16 and 18 elevated to inoperative positions. However, even when retracted the driven road wheels 18 are rotating and can pose a safety hazard. Thus, in accordance with one feature of the invention, the driven road wheels 18 are retracted behind the access steps 20 to a relatively safe position.

Figure 2:
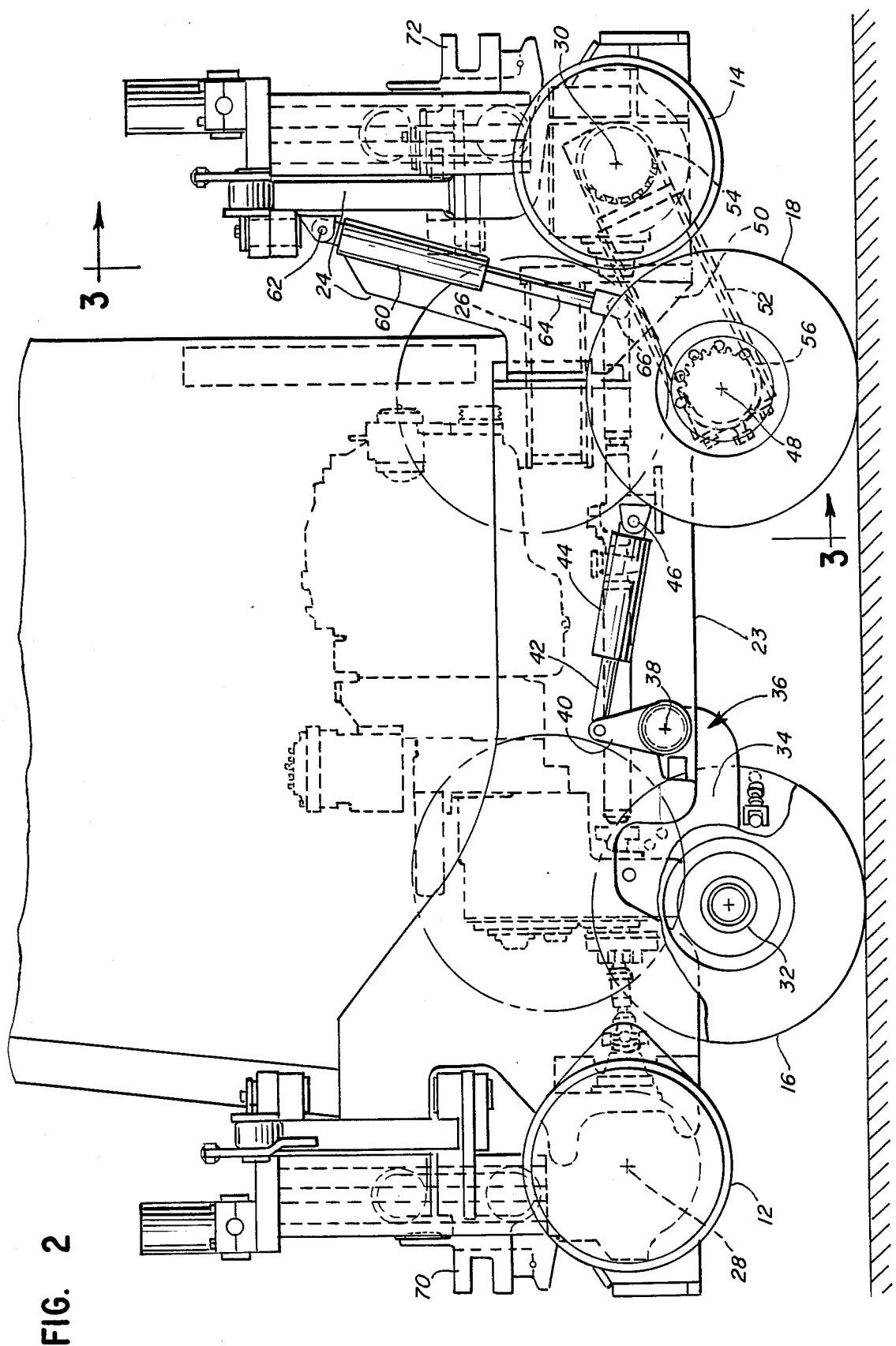
FIG. 2 is a side elevational view of a railcar moving vehicle constructed in accordance with the present invention and showing the road wheels in their lowered, operative positions as when operating on roadway.
Figure 4:
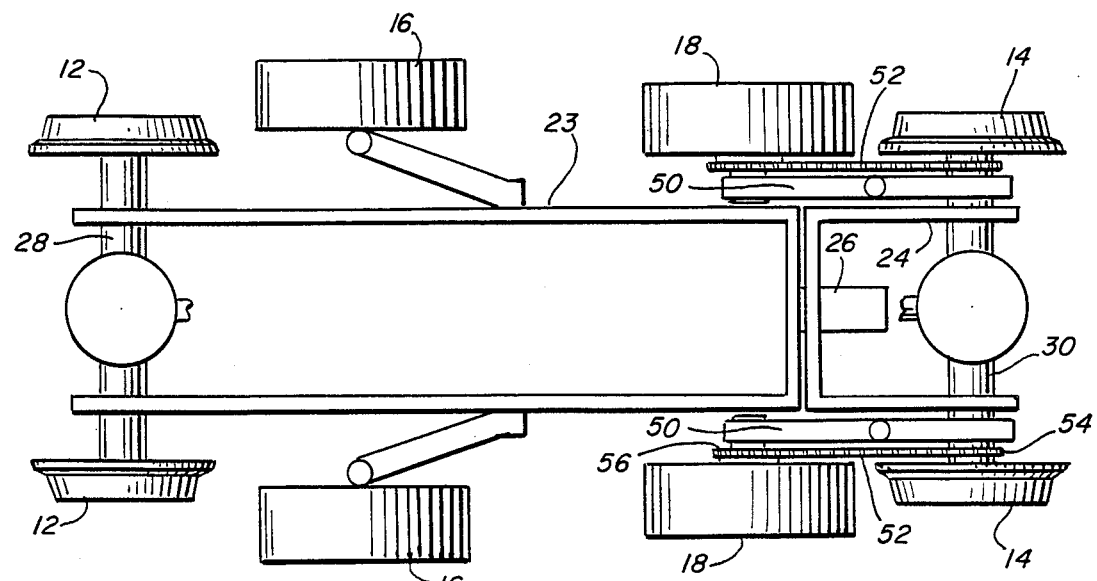
FIG. 4 is a schematic top plan view of the main frame and the rear pivotable frame illustrating in accordance with the present invention that the rear rail wheels and the rear driven road wheels are mounted on the pivotable frame with the driven road wheels being pivotally carried on the rail wheel axle.

FIGS. 2 and 4 show a front main frame member 23 and a rear pivotable frame member 24. The relatively short rear frame member 24 is connected to the main frame 23 by a longitudinal pivot pin 26 to permit relative pivotal movement between the two frame members. In the preferred embodiment described herein, the total pivotal or oscillating angle between the two frame members is 16 degrees.

Still referring to FIGS. 2 and 4, the front rail wheels 12 are carried on a front rail wheel axle 28 which is mounted on the main frame member 23. The rear rail wheels 14 are carried on a rear rail wheel axle 30 which is mounted on the pivotable frame member 24. Accordingly, oscillating or pivotal motion is permitted between the front and rear rail wheels to improve maneuverability over uneven track and effect balanced loading on the several rail wheels thereby improving draw bar pull.

The front road wheels 16 are not driven wheels but are steerable to afford front wheel steering for the railcar moving vehicle of the present invention. Those front road wheels 16 are each carried on a corresponding front road wheel axle 32 (see FIG. 2) which is mounted on one end 34 of a bellcrank lever 36 which is pivotally connected to the main frame 23 at 38. The other end 40 of the bellcrank lever 36 is pinned to a piston rod 42 of a hydraulic cylinder 44, the other end of the cylinder being pinned to the main frame 23 at 46.

When cylinder 44 is retracted to pivot bellcrank 36 clockwise, the front road wheel 16 is raised to its inoperative position as shown in FIG. 1. Similarly, when the hydraulic cylinder 44 is extended, bellcrank lever 36 is pivoted in a counterclockwise direction to lower the corresponding front road wheel 16 to an operative position as shown in FIG. 2 where the rail wheels 12 are elevated above the ground. It should be understood that a second cylinder 44 and bellcrank 36 as shown in FIG. 2 are provided on the opposite side of the vehicle for actuating the other front road wheel 16.

Figure 3:
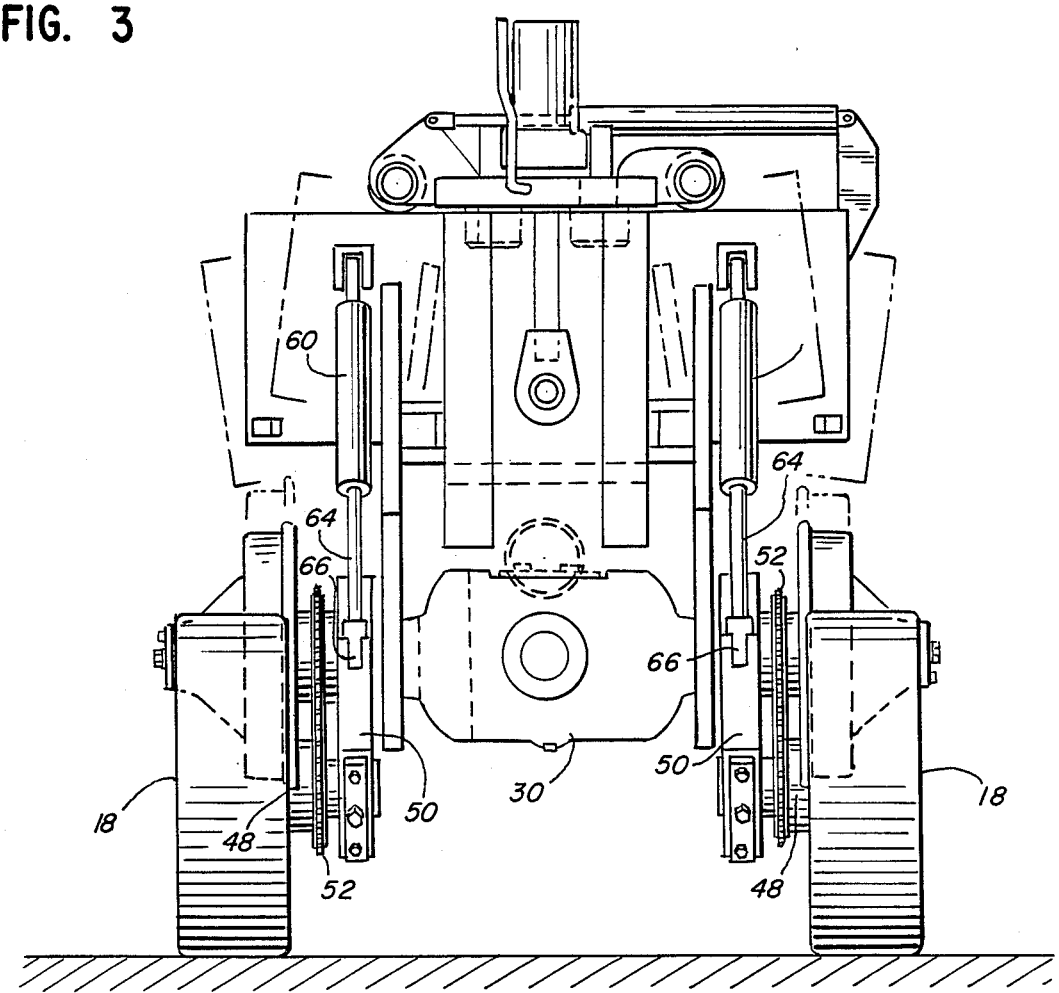
FIG. 3 is a vertical sectional view taken substantially along the line 3—3 of FIG. 2.

The rear road wheels 18 are each journalled on a respective axle 48 which is mounted on one end of a road arm 50, the other end of the arm 50 being pivotally carried on the rear rail wheel axle 30 as shown in FIGS. 2 and 4. A drive chain 52 is mounted on a rail wheel axle sprocket 54 and a road wheel sprocket 56 associated with the road wheel axle 48 to drive the road wheels 18 from the rail wheels 14, each of the four rail wheels being driven by conventional engine means and front and rear differential drive axles. As shown in FIGS. 3 and 4, a pair of drive chains 52 are provided, one on each side of the frame, for driving the respective road wheels 18.

As best shown in FIG. 2, a hydraulic cylinder 60 has its upper end connected to the pivotable frame 24 at 62 and the lower end of the piston rod 64 is connected to the road arm 50 at 66. When the cylinder 60 is shortened, the road arm 50 is pivoted clockwise about the rail axle 30 to raise the road wheel 18 from its lower operative position shown in solid lines to its raised inoperative position shown in dash lines.

Similarly, when the cylinder 60 is extended to the position shown in FIG. 2, the road wheels 18 are moved down to their lower operative positions which causes the rail wheels 14 to be elevated. It will be seen from FIG. 3 that two cylinders 60 are provided, one on each side of the vehicle, for actuating a corresponding one of the road wheels 18. In accordance with conventional practice, the front road wheels 16 and rear road wheels 18 are raised and lowered conjointly through simultaneous actuation of the cylinders 44 and 60.

The operation of the railcar moving vehicle of the present invention will now be described. When the vehicle is to be operated on rail to push or pull one or more railcars, there are provided couplers 70 and 72 at the opposite ends of the vehicle (see FIG. 2) as is known in the art. In the rail mode, the cylinders 44 and 60 are retracted to raise the road wheels 16 and 18 to their inoperative positions so the rail wheels 12 and 14 are operative as shown in FIG. 1.

When the vehicle is in the rail mode as shown in FIG. 1, the forward rail wheels 12 which are mounted on the main frame 23 can oscillate or pivot about the longitudinal axis of the pin 26 relative to the rear rail wheels 14 which are mounted on the pivotable frame 24. Accordingly, there is provided an equalizing pivoting action because the front frame assembly 23 and the rear frame assembly 24 can oscillate with respect to each other around the centerline of the longitudinal pin 26 when load reactions are induced to any of the rail wheels. Such an arrangement allows all four rail wheels to maintain equal wheel loadings in spite of uneven conditions in the rail with a total oscillating angle between the two frames of up to 16 degrees.

Similarly, when the vehicle is in the road mode as shown in FIG. 2, the forward steerable road wheels 16 which are mounted on the main frame 23 can oscillate or pivot about the longitudinal axis of the pin 26 relative to the rear driven road wheels 18 which are pivotally suspended from the rear rail wheel axle 30 which is carried on the pivotable frame 24 along with the cylinders 60 which raise and lower the wheels 18. As a result, even when in the road mode, the front and rear road wheels can oscillate relative to one another under uneven road conditions to maintain equal wheel loadings.

Thus, in accordance with the present invention, there is provided equalizing pivoting action for the four rail wheels and also for the four road wheels. The important advantage of the foregoing feature is that both the rail wheels and the road wheels can maneuver over uneven track or uneven terrain while maintaining equal wheel loadings at all times. Among the other advantages of the present invention are better vehicle stability, front wheel steering, better maneuverability over rough terrain, and better draw bar pull due to the even wheel loadings.

What is claimed is:

1. A railcar moving vehicle of the type having a two-piece oscillating frame including a first relatively long main frame at the forward end of the vehicle and a second relatively short pivotable frame at the rear end of the vehicle which is pivotally movable relative to said main frame about a generally longitudinal axis, said vehicle having four driven rail wheels for operating on rail and four road wheels for operating on the road, said road wheels being movable between lower operative positions and raised inoperative positions, the improvement comprising, in combination, a front railwheel axle mounted on said main frame adjacent the forward end thereof and carrying the front two of said railwheels, a second railwheel axle mounted on said pivotable frame adjacent the rear end thereof and carrying the rear two of said railwheels, a first pair of said road wheels comprising non-driven, steerable road wheels mounted on said main frame rearwardly of said front rail wheels and mounted for pivotal movement between said lower and raised positions about a road wheel pivot axis located rearwardly of said steerable road wheels, first hydraulic cylinder means mounted on said main frame for lowering and raising said steerable road wheels, a second pair of said road wheels being mounted on said pivotable frame forwardly of said rear wheels and driven from said rear rail wheel axle, said second pair of road wheels being mounted for pivotal movement between said lower and raised positions about the axis of said rear railwheel axle, and second hydraulic cylinder means mounted on said pivotable frame for raising and lowering said second pair of road wheels.

2. A railcar moving vehicle as defined in claim 1 in which a cab is mounted on said main frame, said cab having depending access steps on each side thereof, and said second pair of road wheels being positioned to be received behind respective access steps when raised to inoperative positions, said second pair of road wheels being driven from said second rail wheel axle in both said raised and lowered positions.

3. A railcar moving vehicle as defined in claim 1 where each of said rear road wheels is carried on one end of a corresponding one of a pair of road arms, the other end of each road arm being mounted for pivotal movement about the axis of said rear railwheel axle, said second hydraulic cylinder means comprising a pair of hydraulic cylinders each having one end connected to a corresponding one of said road arms and its other end fixed relative to said pivotable frame.

4. A railcar moving vehicle as defined in claim 3 where drive chain means drives said rear road wheels from said rear railwheel axle.

* * * * *